United States Patent [19]

Sood

[11] Patent Number: 5,293,645
[45] Date of Patent: Mar. 8, 1994

[54] APPARATUS AND METHOD FOR LOCATING MOBILE AND PORTABLE RADIO TERMINALS IN A RADIO NETWORK

[75] Inventor: Prem L. Sood, Vancouver, Wash.

[73] Assignee: Sharp Microelectronics Technology, Inc., Camas, Wash.

[21] Appl. No.: 771,195

[22] Filed: Oct. 4, 1991

[51] Int. Cl.$^5$ .................. H04B 7/005; H04B 17/02
[52] U.S. Cl. .................. 455/54.1; 455/56.1; 455/67.6; 379/58
[58] Field of Search .................. 455/11.1, 12.1, 13.1, 455/15, 20, 24, 33.1, 33.2, 33.3, 53.1, 54.1, 54.2, 56.1, 67.6; 379/58, 59, 60, 61, 63; 342/357, 126, 127, 450, 451, 457; 340/988, 991, 992, 993

[56] References Cited

U.S. PATENT DOCUMENTS

| | | | |
|---|---|---|---|
| 3,531,801 | 9/1970 | Huebscher | 342/126 |
| 3,711,856 | 1/1973 | Adrian et al. | 455/20 |
| 4,229,620 | 10/1980 | Schaible | 379/58 |
| 4,398,198 | 8/1983 | Dano et al. | 342/451 |
| 4,696,051 | 9/1987 | Breeden | 455/51.2 |
| 5,043,736 | 8/1991 | Darnell et al. | 342/357 |
| 5,119,102 | 6/1992 | Barnard | 342/457 |
| 5,128,925 | 7/1992 | Dornstetter et al. | 455/56.1 |
| 5,163,004 | 11/1992 | Rentz | 342/451 |

FOREIGN PATENT DOCUMENTS 2215932A  9/1989  United Kingdom .

OTHER PUBLICATIONS

Sweeney, Dan; "The Quest for Spectrum Efficiency", Cellular Business, Jun. 1991; pp. 24–26, 28, 32, 34, 36.

Primary Examiner—Reinhard J. Eisenzopf
Assistant Examiner—Lisa Charouel
Attorney, Agent, or Firm—Martin C. Fliesler

[57] ABSTRACT

A system for locating a movable radio terminal within a cellular telephone network, or other radio network, which includes a plurality of base stations that transmit synchronized timing reference signals. A receiver in the network receives transmissions from the radio terminals to be located that include information compiled at the radio terminal indicating relative propagation delays in receipt of the timing reference signals from at least three base stations. A processor coupled with the receiver, processes the transmissions indicating relative propagation delays to identify a geographic location of the radio terminal. A complementary radio terminal receives the timing reference signals from base stations, including a designated base station and compiles information indicating propagation delays, relative to the propagation delay of the timing reference signal from the designated base station, from at least two additional base stations. The radio terminal transmits the information compiled so that a station receiving the transmission may locate the radio terminal in response to the information and the known locations of base stations in the network.

20 Claims, 4 Drawing Sheets

FIG.—1

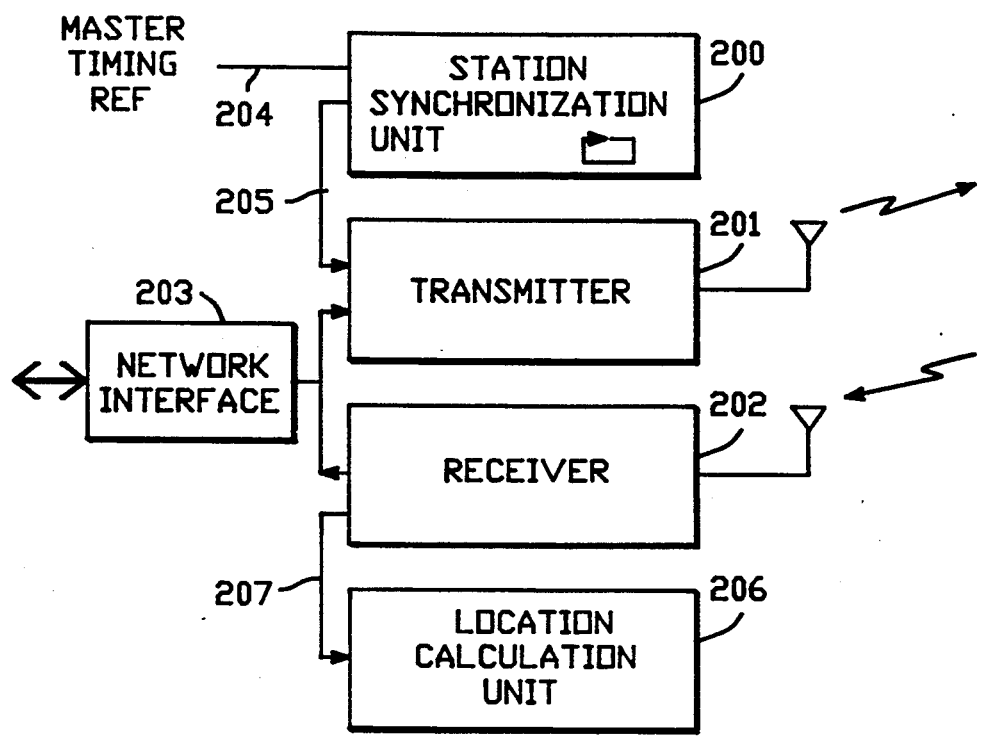
FIG.—4
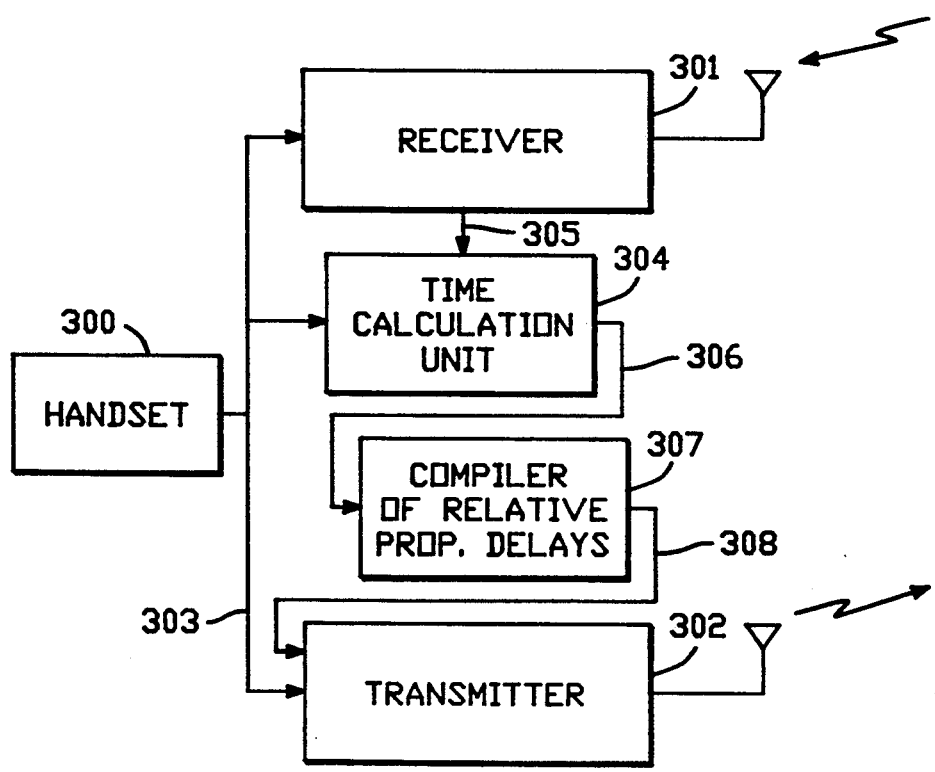
FIG.—5

APPARATUS AND METHOD FOR LOCATING MOBILE AND PORTABLE RADIO TERMINALS IN A RADIO NETWORK

FIELD OF THE INVENTION

The present invention relates to radio communication systems, such as cellular telephone systems, having a number of base stations communicating with movable radio terminals; and more particularly to systems for locating movable radio terminals within such radio systems.

BACKGROUND OF THE INVENTION

Cellular telephone systems are becoming a significant part of the telecommunications network worldwide. These cellular telephone systems are typically implemented using a radio technology in which there are a plurality of base stations positioned throughout a geographic region. As a user of the network moves around within the geographic region, the mobile or portable telephone establishes communications channels with the base stations. The base stations are connected to the existing telephone network, and thus provide access by the mobile or portable telephone to a worldwide telecommunications system.

Radio terminals in cellular networks are known popularly as portable terminals or mobile terminals. The portable terminal typically refers to a handheld device that can be carried from place to place. A terminal which is mounted in an automobile or other vehicle is typically referred to as a mobile terminal. In the present application, the term "movable terminal" will be used to refer to both types, and generically to any movable radio terminal used in a network similar to that described and claimed herein.

Frequently it is desirable to determine the location of a movable radio terminal as it is moved around within a certain area. For example, it would be desirable to determine the location of the movable telephone in case of a medical or safety emergency so that help may be dispatched.

One prior art system for locating radio terminals within a cellular radio network is described in UK Patent Application No. GB 2 215 932 A, published Sep. 27, 1989, entitled RADIO COMMUNICATION SYSTEM, by McCaughan, et al. According to the MoCaughan, et al.. application, a designated base station selects and instructs other base stations independently to send acknowledgement request messages to the movable radio terminal. The base stations independently measure the roundtrip delay, including estimating the time it takes the radio terminal to receive and decode the request, and generate and send the acknowledgement. Since the time that it takes for the radio terminal to receive and decode the request, and generate and send the response is typically much longer than the roundtrip radio signal propagation times, and is variable, the method described in the McCaughan, application does not give very accurate location information Furthermore, the messages from the base stations arrive at uncoordinated times at the radio terminal, either overloading the radio terminal, or increasing the variability in response time to the various base stations. Also, this reliance on messages initiated from the base stations could interfere with other functions being carried out with the movable radio terminal. Furthermore, the location system described in this UK patent application increases the messaging load on the system, and could cause the radio system to reach a capacity overload point sooner.

Accordingly, it is desirable to provide a more accurate system for locating movable radio terminals which does not unreasonably burden the radio communication network.

SUMMARY OF THE INVENTION

The present invention provides a movable terminal initiated system for locating a movable radio terminal within a cellular telephone network, or other radio system.

More generally, a method and apparatus are provided according to the present invention that allow identification of the location of mobile or portable radio terminals in a geographic area served by a radio system. The terminals can be voice and/or data terminals. The location can be identified at different levels of accuracy depending on the implementation complexity of the scheme. The radio system can be analog or digital radio, and be applied to varying types of each providing that the system includes base stations transmitting timing reference signals. A radio digital time division multiple access (TDMA) system and a radio code division multiple access (CDMA) system are examples of suitable networks in which the present invention can be applied.

According to one aspect, the present invention provides an apparatus for locating radio terminals in a radio network which includes a plurality of base stations that transmit a timing reference signal that is substantially synchronized with timing reference signals transmitted by other base stations in the network. A receiver, typically coupled with one of the base stations, is adapted to receive transmissions from the radio terminals to be located. The transmissions include information compiled at the radio terminal indicating relative propagation delays in receipt of the timing reference signals by the radio terminal. A processor coupled with the receiver, processes the transmissions indicating relative propagation delays to identify a geographic location of the radio terminal.

In one aspect of the invention, the timing reference signals transmitted by the base stations are synchronized with a master timing reference signal. This master timing reference signal can be supplied by direct communication links among the base stations to establish accurate synchronization of the timing reference signals.

The processor is responsive to the information transmitted from the radio terminals indicating relative propagation delays for the timing reference signals to determine an estimated propagation distance from at least three base stations to the terminal. Based on the propagation distances, and known locations of the base stations, a geographic location of the radio terminal can be located using "triangulations " or other geographical intersection techniques.

The present invention also provides a movable radio terminal including features used in locating the terminal in networks like that summarized above. The radio terminal oomprises a receiver receiving the timing reference signals from base stations, including a designated base station. A processor compiles information indicating propagation delays, relative to the propagation delay of the timing reference signal from the designated base station, from at least two additional base stations. A transmitter on the receiver transmits the information compiled so that a location unit receiving the transmission may locate the radio terminal in response to the information and the known locations of base stations in the network.

The present invention can also be characterized as a method for locating a movable radio terminal in a radio network that includes a plurality of base stations transmitting timing reference signals. The method includes the steps of:

synchronizing the timing reference signals in the plurality of base stations;

receiving a transmission from the movable radio terminal including information indicating relative propagation delays of the timing reference signals from at least three base stations to the movable radio terminal;

processing the information to determine estimated propagation distances to the movable radio terminal from at least three base stations; and locating the movable radio terminal in response to the estimated propagation distances and known locations of the base stations in the network.

Also, according to another aspect of the invention, the present invention provides a method for providing information from a movable radio terminal, from which its location can be identified in a radio network according to the method outlined above. This method comprises the steps of:

receiving, at the movable radio terminal, timing reference signals from at least three base stations in the plurality;

identifying, at the movable radio terminal, a designated base station;

determining, at the movable radio terminal, propagation delays of the received timing reference signals relative to the time of receipt of the timing reference signal from the designated base station; and transmitting, from the movable radio terminal, information indicating the relative propagation delays.

The present invention provides significant advantages over prior art systems. Particularly, location is a movable terminal initiated event that is accomplished without burdening the communications network with a number of complex request and acknowledge transmissions. Also, the method can be accomplished without burdening, unreasonably, the normal processing functions of the movable radio terminal. Finally, it can provide a more acurate indication of the location of a movable radio terminal, depending on the techniques chosen to synchronize the timing reference signals, and measure the propagation delays at the movable radio terminals.

Other aspects and advantages of the present invention can be seen upon review of the figures, the detailed description, and the claims which follow.

BRIEF DESCRIPTION OF THE FIGURES

FIG. 4 is a block diagram of a base station according to the present invention.

FIG. 5 is a block diagram of a movable radio terminal according to the present invention.

DESCRIPTION OF THE PREFERRED EMBODIMENTS

Figure 6:
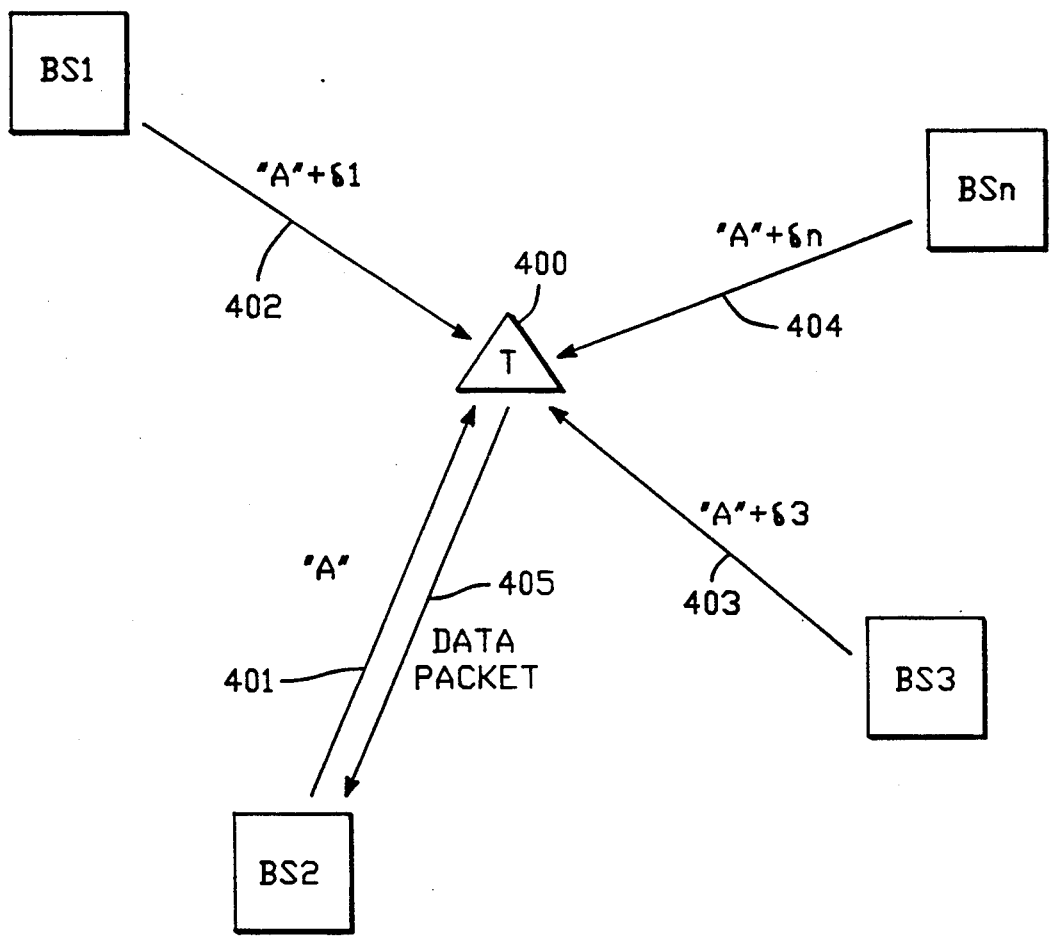
FIG. 6 is a schematic diagram illustrating the technique of locating a movable radio terminal according to the present invention.

A detailed description of the preferred embodiments of the present invention is provided with reference to the figures. FIGS. 1-4 illustrate the implementation of the network and the base stations in the network. FIGS. 5 and 6 illustrate the implementation of the movable radio terminals and the technique for locating a movable radio terminal according to the present invention.

Figure 1:
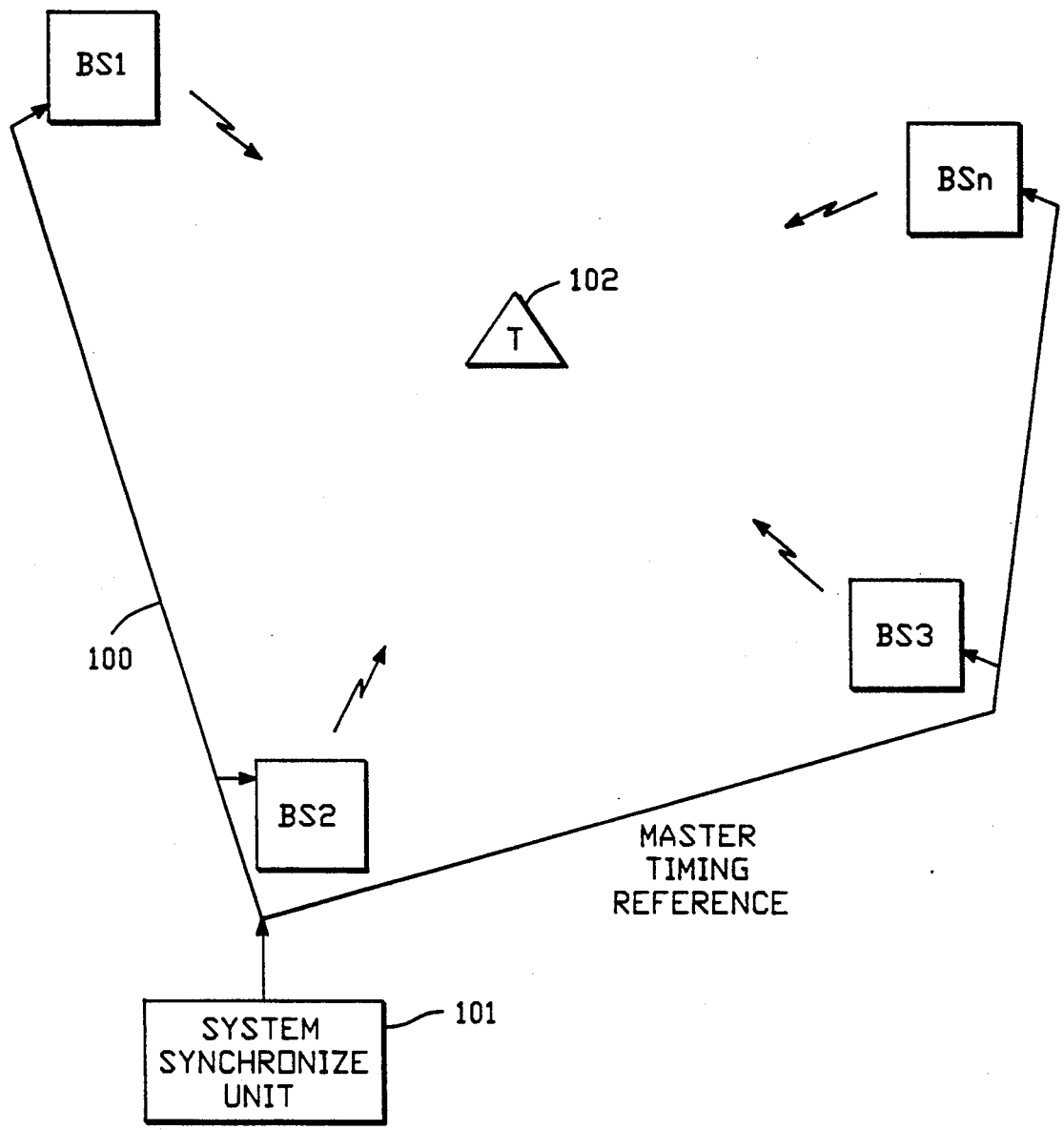
FIG. 1 is a schematic diagram of a radio network according to the present invention.

FIG. 1 schematically illustrates a radio network according to the present invention. The network includes a plurality of base stations, BS1, BS2, BS3, ... BSn. The base stations are connected via communication link 100, such as dedicated T1 phone line, fiber optic communication link, microwave link, or other technologies providing direct communications among the base stations as known in the art. Coupled with the communication link 100 is a synchronizing unit 101 which generates a master timing reference and supplies the timing reference to the plurality of base stations in the network across the link 100. The base stations are implemented as discussed below with reference to FIG. 4 and provide a network by which a movable radio terminal 102 within the network can link up with a telecommunications network. The network shown in FIG. could comprise a cellular network using any one of a variety of technologies characterized by the generation at base stations of timing reference signals.

Figure 2:
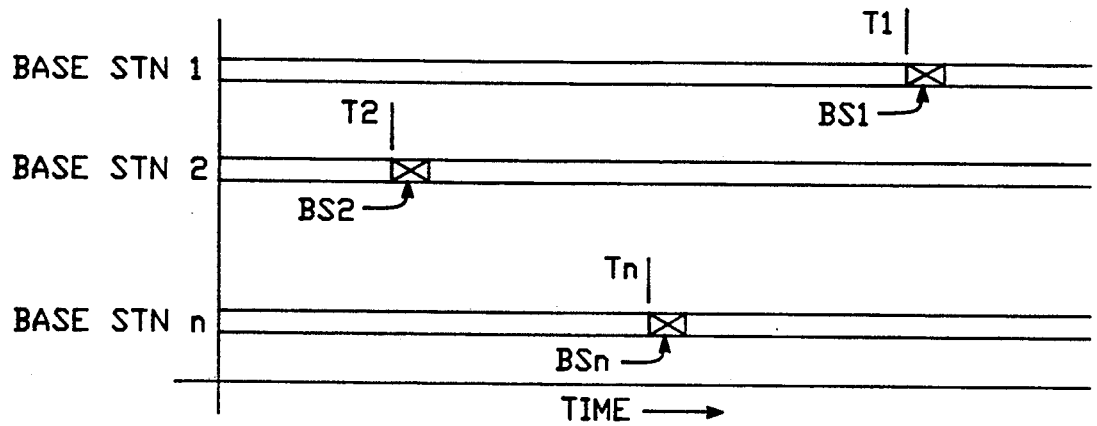
FIG. 2 is a chart illustrating the prior art unsynchronized timing references used in cellular networks.

As shown in FIG. 2, the timing reference signals generated in the prior art networks are unsynchronized. Thus, a timing reference for base station BS1 may be transmitted from base station BS at a time T1, while a timing reference for base station BS2 may be transmitted from base station BS2 at a time T2, and a timing reference signal for base station BSn may be transmitted from base station BSn at time Tn. The times T1, T2, and Tn are independent and asynchronous at the various base stations.

These timing reference signals are used in networks such as the TDMA system referred to above for the purpose of identifying the location of time slots that carry information to and from the terminals assigned those time slots. These timing reference signals can also be used for a variety of other purposes known in the art.

Figure 3:
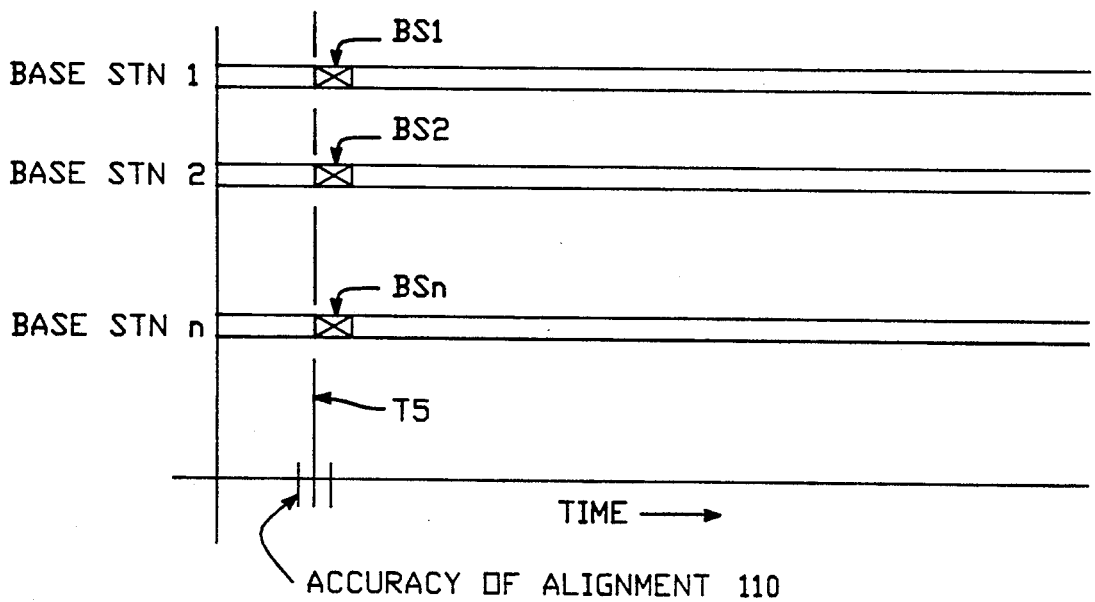
FIG. 3 is a chart illustrating synchronized timing references according to the present invention.

According to the present invention, the timing reference signals at the base stations in the network are synchronized as shown in FIG. 3 in response to a master timing reference, as illustrated in FIG. 1. Thus, the timing reference signals for all base stations BS1, BS2, BSn are all transmitted from the respective base stations at the same time Ts, within the tolerances of the system synchronization technique which establish an accuracy of alignment 110 as shown in FIG. 3.

Because the timing reference signals of the base stations in the network are all transmitted at the same time Ts, the relative propagation delays from the base stations to the movable terminals in the network, indicate the distances from the base stations to the movable terminal. This information can be used to locate the terminal within the network based on the propagation delays and the known locations of the base stations in the network.

The synchronization technique illustrated with reference to FIG. 3 shows all of the timing reference signals aligned with a single time Ts. Alternative embodiments may synchronize the timing reference signals, but offset the transmission of the various signals by predefined intervals. In such alternative systems, the timing reference signals are synchronized, but offset.

FIG. 4 illustrates a block diagram of a base station for use in the network according to the present invention. Each base station includes a station synchronization unit 200, a transmitter 201, a receiver 202, and a network interface 203. The station synchronization unit 200 receives the master timing reference across line 204 and generates a base station timing reference signal across line 205 which is adjusted based upon network parameters, such as known or measured propagation times for the master timing reference signal to the base station, to be synchronized with other base station timing reference signals. The base station timing reference signal is transmitted at pre-established intervals by the transmitter 201. The master timing reference 204 may be supplied directly to the station synchronization unit 200, as heuristically shown in FIG. 4, or may be supplied through the network interface 203, depending on the implementation of a particular network.

A location calculation unit 206 is mounted in at least a subset of the base stations in the network. This calculation unit 206 receives transmissions across line 207 from the receiver 202 which include information indicating the relative propagation delays for timing reference signals to a radio terminal in the network. Based on this information, the location of the radio terminal can be calculated as described in detail below.

The location calculation unit 206 need not be mounted in every base station in the network. It is sufficient that it be mounted in enough base stations that any movable terminal to be located in a network may communicate with at least one location calculation unit.

Alternatively, the location calculation unit may be coupled to the telecommunications network independent of the base stations. Also, alternative systems may include a location calculation unit with an independent receiver in selected geographic regions within the network.

FIG. 5 is a block diagram of a movable radio terminal according to the present invention. The movable radio terminal includes a handset 300 which is used such as a telephone in a cellular telephone network. Coupled with the handset are a receiver 301 and a transmitter 302, which communicate with the handset across line 303. Also in the movable radio terminal according to the present invention, a time calculation unit 304 is connected to the receiver across line 305 and to the handset across line 303. The time calculation unit 304 is connected across line 306 to a compiler 307 which compiles information indicating relative propagation delays for timing reference signals. The compiler generates a data packet including the information and supplies that data packet across line 308 to the transmitter 302 for transmission to a location calculation unit in the network.

FIG. 6 is a heuristic diagram of the network according to the present invention for describing the technique used for locating movable radio terminals, such as terminal 400, in a network.

A terminal 400 may be implemented such as shown in FIG. 5. In this terminal, a user who desires its location to be determined, such as in the case of a medical or safety emergency, issues a command using the handset 300. Alternatively, the terminal may be designed to respond to a command originating from other sources in the network. In response to the command, the time calculation unit 304 identifies a designated base station, preferably the serving base station, such as base station BS2 in FIG. 6. The timing calculation unit 304 then determines the time that the timing reference signal 401 from the designated base station BS2 is received at the terminal. Next, the time calculation unit determines the difference $\delta 1$ in time between receipt of the timing reference signal from the designated base station BS2, and the receipt of the timing reference signal 402 from the base station BS1. Similarly, the time calculation unit determines the difference $\delta 3$ between the time of receipt of the timing reference signal 401 from the designated base station BS2, and receipt of the timing reference signal 403 from base station BS3. Also, the timing calculation unit determines the time n between the time of receipt of the timing reference signal 401 from the designated base station BS2 and receipt of the timing reference signal 404 from base station BSn.

The time calculation unit 304 then supplies this information to the compiler 307 which compiles a data packet 405, that includes identifications of the designated base station and the reporting base stations, and the relative propagation delay values of $\delta 1$, $\delta 3$, and $\delta n$.

This data packet 405 is received by a location calculation unit, such as location oalculation unit 206 in FIG. 4. The location oaloulation unit then has information sufficient to identify the location of the terminal 400, when combined with the known locations of the reporting base stations. That is, it is known that the propagation delay Pn from the base station BSn to the movable radio terminal 400 is equal to the propagation delay A for the designated base station BS2 to the terminal 400, plus $\delta n$.

The location calculation unit thus receives information indicating a relative time of receipt of the timing references of at least 3 and preferably as many as 6 base stations, relative to the receipt of a timing reference from a designated base station.

The data packet 405 is preferably sent to a base station including a location calculation unit across an assigned channel in the network.

The location calculation unit solves the information indicating relative propagation delays to solve for the single variable A of the absolute delay from the designated base station. This is done using knowledge of the geographic location of the reporting base stations using the following processing elements or steps:

1. Establish a rough estimate of the variable A. For a TDMA system, this may be derived from measurement of the roundtrip delay of transmission from the designated base station (usually the station serving the movable radio terminal of the network), and must include any time alignment adjustments that a terminal has made to fit its TDMA time slot transmission into the expected received TDMA time slot window. An alternative method to establish a rough estimate for "A" is to directly read the total value from the serving base station of time alignment adjustments made to fit the start of the transmission within the time slot.

2. Solve for the value of A that gives the lowest mean square error for the set of equations defined for the propagation delay of each reporting base station, where a circle having a radius $A + \delta 1$ centered on base station BSl, a circle having a radius $A + \delta 3$ centered on BS3, and a circle having radius $A + \delta n$ centered on base station BSn, all intersect at the location of the terminal with a circle having radius A centered on a designated base station BS2. These values indicate propagation distances and may be translated to distance by multiplication by the radio propagation velocity.

3. Once the value A is determined, its value is used to calculate the distance from each base station to the movable terminal. The location of the terminal is then determined using geographical intersection techniques.

The location calculation unit, and compiler of data packets including relative propagation delays, may be implemented using microcomputers or microprocessors programmed using well known techniques.

It will be understood by those skilled in the art that a wide variety of techniques may be used for calculating the value of A, or solving for the distance from the base stations based on information indicating the relative propagation delays to the terminal to be located, from a plurality of base stations in the network.

Accordingly, the apparatus and method provided by the present invention establish synchronism between timing reference signals at base stations in the network, and compute relative propagation delays in receipt of the timing reference signals, at the terminal to be located from base stations in the vicinity of the terminal. Based on the information indicating relative propagation delays, the actual propagation distances to the terminal from the base stations can be determined. With information indicating the propagation distances, the location of the terminal can be fixed.

The accuracy of location of the terminal is determined primarily by the accuracy of synchronization of the timing reference signals, and the accuracy in the measurement of the relative propagation delays on the movable radio terminal. It does not depend on such variable factors as the amount of time a radio terminal takes to receive, decode, and respond to a particular message. Nor does it burden the communication network with a large number of signals generated for the purpose of locating a terminal, without further serving the primary communication function of the network.

Since the timing references are synchronized at the base stations, the present invention does not consume an unreasonable amount of firmware or software processing resources. The movable terminal may perform relative timing measurements autonomously without any further action by the base stations, when it has free processing time. Thus, location can be accomplished without affecting any normal functions of the radio terminal or causing significant system load. For the North American cellular radio system, the timing reference signals occur very regularly, i.e., every 7 milliseconds. Therefore, a movable radio terminal may do relative timing measurement at essentially any time in response to a user command.

Accordingly, the present invention allows for more accurate location of movable terminals, less system message load, and less chance of overloading the processing facility at the movable radio terminal, and thereby the normal communication functions of that terminal may be left undisturbed.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for locating a radio terminal in a radio network, comprising:
a plurality of base station in the radio network, each including a transmitter and a receiver communicating with the radio terminal if the radio terminal is located within an operating range of one of the plurality of base stations and transmitting a timing reference signal substantially synchronized with the timing reference signals transmitted by other base stations in the plurality of base stations, wherein the radio terminals includes a processor for compiling information indicating relative propagation delays of the timing reference signals from at least three base stations in the plurality of base stations;
means, in the radio network, for receiving transmissions from the radio terminal to be located, the transmissions including the information compiled at the radio terminal indicating the relative propagation delays in receipt of the timing reference signals by the radio terminal; and
means coupled with the means for receiving, for processing the transmissions indicating the relative propagation delays to identify a geographic location of the radio terminal.

2. The apparatus of claim 1, including an additional base station having a transmitter and a receiver in the radio network, and wherein the means for receiving comprises the receiver in the additional base station.

3. The apparatus of claim 1, further including:
means mounted in respective base stations in the plurality of base stations, for synchronizing the timing reference signal of the respective base station with a master timing reference signal.

4. The apparatus of claim 1, wherein the means for processing includes:
means, responsive to the information indicating relative propagation delays, for determining estimated propagation distances to the radio terminal from at least three base stations in the plurality of base stations; and
means, responsive to the estimated propagation distances and known locations of the plurality of base stations, for identifying the geographic location for the radio terminal.

5. The apparatus of claim 1, further including:
means for supplying a master timing reference signal to the plurality of base stations; and
means, mounted in respective base stations in the plurality of base stations, for synchronizing the timing reference signal of the respective base station with the master timing reference signal.

6. The apparatus of claim 5, wherein the means for supplying includes a direct communication link to the plurality of base stations.

7. An apparatus for locating a radio terminal in a radio network, comprising:
a plurality of base stations, each including a transmitter transmitting a timing reference signal, wherein the radio terminal includes a processor for compiling information indicating relative propagation delays of the timing reference signals from at least three base stations in the plurality of base stations;

means for supplying a master timing reference signal to the plurality of base stations;

means mounted in respective base stations in the plurality of base stations, for synchronizing the timing reference signal of the respective base station with the master timing reference signal;

a receiver in the plurality of base stations, adapted to receive transmissions from the radio terminal to be located, the transmissions including the information compiled at the radio terminal indicating the relative propagation delays of the timing reference signals by the radio terminal, relative to the propagation delay from a designated base station in the plurality of base stations; and means coupled with the receiver, for processing the transmissions indicating the relative propagation delays to identify a geographic location of the radio terminal.

8. The apparatus of claim 7, wherein the means for supplying includes a direct communication link to the plurality of base stations.

9. The apparatus of claim 7, wherein the means for processing includes:

means, responsive to the information indicating relative propagation delays, for determining estimated propagation distances to the radio terminal from the designated base station, and at least two additional base stations in the plurality of base stations; and means, responsive to the estimated propagation distances and known locations of the plurality of base stations, for identifying the geographic location for the radio terminal.

10. For use in a radio network including a plurality of base stations transmitting synchronized timing reference signals, a radio terminal comprising:

a receiver receiving the timing reference signals from base stations in the plurality of base stations, including a designated base station, in a region near the receiver;

means coupled with the receiver, for compiling information indicating propagation delays, relative to the propagation delay of the timing reference signal from the designated base station, of the timing reference signals from at least two additional base stations in the plurality of base stations in the region near the receiver; and a transmitter, coupled with the means for compiling, for transmitting information indicating the relative propagation delays of the timing reference signals, so that the radio terminal may be located in response to the transmission and known locations of the base stations in the plurality of base stations.

11. A method for locating a movable radio terminal in a radio network including a plurality of base stations transmitting timing reference signals, comprising:

synchronizing the timing reference signals in the plurality of base stations;

receiving a transmission from the movable radio terminal including information indicating relative propagation delays of the timing reference signals from at least three base stations to the movable radio terminal;

processing the information to determine estimated propagation distances to the movable radio terminal from at least three base stations in the plurality of base stations; and locating the movable radio terminal in response to the estimated propagation distance and known locations of the base stations in the plurality of base stations.

12. The method of claim 11, wherein the step of synchronizing comprises:

synchronizing the timing reference signals of the respective base stations in the plurality of base stations with a master timing reference signal.

13. The method of claim 11, wherein the step of synchronizing comprises:

supplying a master timing reference signal to the plurality of base stations; and synchronizing the timing reference signals of the respective base stations in the plurality of base stations with the master timing reference signal.

14. For a radio network including a plurality of base stations transmitting synchronized timing reference signals, a method for providing information from a movable radio terminal from which its location may be identified, comprising:

receiving, at the movable radio terminal, the timing reference signals from at least three base stations in the plurality of base stations;

identifying, at the movable radio terminal, a designated base station in the plurality of base stations;

determining, at the movable radio terminal, propagation delays of the received timing reference signals relative to the time of receipt of the timing reference signal from the designated base station; and transmitting, from the movable radio terminal, the information indicating the relative propagation delays.

15. An apparatus for locating a radio terminal in a radio network, comprising:

a plurality of base stations for the radio network, each including a transmitter transmitting a timing reference signal substantially synchronized with the timing reference signals transmitted by other base stations in the plurality of base stations, wherein the radio terminal includes a processor for compiling information indicating relative propagation delays of the timing reference signals from at least three base stations in the plurality of base stations;

a receiver, mounted in at least one base station in the plurality of base stations, to receive transmissions from the radio terminal to be located, the transmissions including the information compiled at the radio terminal indicating relative propagation delays in receipt of the timing reference signals by the radio terminal; and means, coupled with the receiver, for processing the transmissions indicating the propagation delays to identify a geographic location of the radio terminal.

16. The apparatus of claim 15, further including:

means, mounted in respective base stations in the plurality of base stations, for synchronizing the timing reference signal of the respective base station with a master timing reference signal.

17. The apparatus of claim 15, wherein the means for processing includes:

means, responsive to the information indicating relative propagation delays, for determining estimated propagation distances to the terminal from at least three base stations in the plurality of base stations; and means, responsive to the estimated propagation distances and known locations of the plurality of base stations, for identifying the geographic location for the radio terminal.

18. The apparatus of claim 15, further including:

means for supplying a master timing reference signal to the plurality of base stations; and means, mounted in respective base stations in the plurality of base stations, for synchronizing the timing reference signal of the respective base station with the master timing reference signal.

19. The apparatus of claim 18, wherein the means for supplying includes a direct communication link to the plurality of base stations.

20. The apparatus of claim 1, wherein the plurality of base stations comprise a cellular radio network.

* * * * *